United States Patent
Coggio et al.

(10) Patent No.: US 8,891,038 B2
(45) Date of Patent: Nov. 18, 2014

(54) LIGHTGUIDE WITH OPTICAL FILM CONTAINING VOIDS AND BLACKLIGHT FOR DISPLAY SYSTEM

(75) Inventors: William D. Coggio, Hudson, WI (US); John A. Wheatley, Lake Elmo, MN (US); Tao Liu, Woodbury, MN (US); Brian W. Ostlie, Hudson, WI (US); Encai Hao, Woodbury, MN (US); William Blake Kolb, West Lakeland, MN (US); Qingbing Wang, Woodbury, MN (US); Michael Benton Free, St. Paul, MN (US); Michael L. Steiner, New Richmond, WI (US); Scott M. Tapio, Falcon Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 81 days.

(21) Appl. No.: 13/264,354

(22) PCT Filed: Apr. 14, 2010

(86) PCT No.: PCT/US2010/030984
§ 371 (c)(1),
(2), (4) Date: Oct. 13, 2011

(87) PCT Pub. No.: WO2010/120845
PCT Pub. Date: Oct. 21, 2010

(65) Prior Publication Data
US 2012/0026431 A1     Feb. 2, 2012

Related U.S. Application Data

(60) Provisional application No. 61/169,555, filed on Apr. 15, 2009.

(51) Int. Cl.
 *G02F 1/1335*     (2006.01)
 *F21V 8/00*       (2006.01)
 *G02B 5/02*       (2006.01)

(52) U.S. Cl.
 CPC ............ *G02B 6/0051* (2013.01); *G02B 6/0056* (2013.01); *G02B 5/02* (2013.01); *G02B 2207/107* (2013.01)
 USPC ............................................. 349/64; 349/65

(58) Field of Classification Search
 USPC ............................................. 349/64, 65, 112
 See application file for complete search history.

(56) References Cited

U.S. PATENT DOCUMENTS

| 3,712,706 A | 1/1973 | Stamm |
| 3,924,929 A | 12/1975 | Holmen |

(Continued)

FOREIGN PATENT DOCUMENTS

| EP | 0142250 | 5/1985 |
| EP | 1450202 | 8/2004 |

(Continued)

OTHER PUBLICATIONS

ASTM Designation: D 1003-00, "Standard Test Method for Haze and Luminous Transmittance of Transparent Plastics", 2000, pp. 1-6.

(Continued)

*Primary Examiner* — James Dudek
(74) *Attorney, Agent, or Firm* — Robert S. Moshrefzadeh; Lisa P. Fulton

(57) ABSTRACT

Lightguide is disclosed. The lightguide includes a light guiding layer for propagating light by total internal reflection, and an optical film that is disposed on the light guiding layer. The optical film includes a plurality of voids, an optical haze that is not less than about 30%, and a porosity that is not less than about 20%. Substantial portions of each two neighboring major surfaces in the lightguide are in physical contact with each other.

27 Claims, 9 Drawing Sheets

(56) References Cited

U.S. PATENT DOCUMENTS

| | | |
|---|---|---|
| 4,025,159 A | 5/1977 | McGrath |
| 4,127,693 A | 11/1978 | Lemelson |
| 4,202,600 A | 5/1980 | Burke |
| 4,243,618 A | 1/1981 | Van Arnam |
| 4,478,769 A | 10/1984 | Pricone |
| 4,539,256 A | 9/1985 | Shipman |
| 4,588,258 A | 5/1986 | Hoopman |
| 4,618,518 A | 10/1986 | Pricone |
| 4,656,072 A | 4/1987 | Coburn, Jr. |
| 4,672,089 A | 6/1987 | Pricone |
| 4,726,706 A | 2/1988 | Attar |
| 4,726,989 A | 2/1988 | Mrozinski |
| 4,775,219 A | 10/1988 | Appeldorn |
| 4,801,193 A | 1/1989 | Martin |
| 4,906,070 A | 3/1990 | Cobb, Jr. |
| 5,056,892 A | 10/1991 | Cobb, Jr. |
| 5,120,594 A | 6/1992 | Mrozinski |
| 5,156,863 A | 10/1992 | Pricone |
| 5,229,882 A | 7/1993 | Rowland |
| 5,238,623 A | 8/1993 | Mrozinski |
| 5,528,720 A | 6/1996 | Winston |
| 5,614,286 A | 3/1997 | Bacon, Jr. |
| 5,691,846 A | 11/1997 | Benson, Jr. |
| 5,711,589 A | 1/1998 | Oe |
| 5,743,981 A | 4/1998 | Lu |
| 5,759,468 A | 6/1998 | Smith |
| 5,804,610 A | 9/1998 | Hamer |
| 5,808,713 A | 9/1998 | Broer |
| 5,831,766 A | 11/1998 | Martin |
| 5,882,796 A | 3/1999 | Wilson |
| 5,930,041 A | 7/1999 | Thielman |
| 5,946,134 A | 8/1999 | Benson |
| 5,959,774 A | 9/1999 | Benson |
| 5,992,066 A | 11/1999 | Brauer |
| 5,993,954 A | 11/1999 | Radovanovic |
| 6,004,422 A | 12/1999 | Janovec |
| 6,090,861 A | 7/2000 | Mendenhall et al. |
| 6,132,861 A | 10/2000 | Kang |
| 6,139,158 A | 10/2000 | Nilsen |
| 6,166,855 A | 12/2000 | Ikeyama |
| 6,204,202 B1 | 3/2001 | Leung |
| 6,210,858 B1 | 4/2001 | Yasuda |
| 6,224,223 B1 | 5/2001 | Higuchi |
| 6,224,792 B1 | 5/2001 | Janovec |
| 6,231,797 B1 | 5/2001 | Bernard |
| 6,254,675 B1 | 7/2001 | Aldinger |
| 6,285,001 B1 | 9/2001 | Fleming |
| 6,325,515 B1 | 12/2001 | Coderre |
| 6,350,035 B1 | 2/2002 | Smith |
| 6,355,759 B1 | 3/2002 | Sherman |
| 6,368,699 B1 | 4/2002 | Gilbert |
| 6,376,590 B2 | 4/2002 | Kolb |
| 6,383,559 B1 | 5/2002 | Nakamura |
| 6,457,823 B1 | 10/2002 | Cleary |
| 6,461,724 B1 | 10/2002 | Radovanovic |
| 6,573,305 B1 | 6/2003 | Thunhorst |
| 6,656,571 B2 | 12/2003 | Benson |
| 6,677,028 B1 | 1/2004 | Lasch |
| 6,703,463 B2 | 3/2004 | Holguin |
| 6,719,426 B2 | 4/2004 | Magarill |
| 6,843,571 B2 | 1/2005 | Sewall |
| 6,846,089 B2 | 1/2005 | Stevenson |
| 6,884,371 B2 | 4/2005 | Smith |
| 6,890,642 B2 | 5/2005 | Kaminsky |
| 6,899,944 B2 | 5/2005 | Tanaka |
| 6,917,400 B2 | 7/2005 | Nakamura |
| 6,958,860 B2 | 10/2005 | Dontula |
| 6,967,053 B1 | 11/2005 | Mullen |
| 6,984,429 B2 | 1/2006 | Thunhorst |
| 7,027,671 B2 | 4/2006 | Huck |
| 7,068,910 B2 | 6/2006 | Duine |
| 7,072,544 B2 | 7/2006 | Cornelissen |
| 7,132,136 B2 | 11/2006 | Laney |
| 7,157,839 B2 | 1/2007 | Ouderkirk |
| 7,195,360 B2 | 3/2007 | Bacon, Jr. |
| 7,204,616 B2 | 4/2007 | Kitamura |
| 7,251,079 B2 | 7/2007 | Capaldo |
| 7,261,424 B2 | 8/2007 | Smith |
| 7,293,884 B2 | 11/2007 | Sawayama |
| 7,309,135 B2 | 12/2007 | Smith |
| 7,327,415 B2 | 2/2008 | Brickey |
| 7,347,571 B2 | 3/2008 | Bacon, Jr. |
| 7,372,075 B2 | 5/2008 | Shigemura |
| 7,422,334 B2 | 9/2008 | Smith |
| 7,466,373 B2 | 12/2008 | Xu |
| 7,547,105 B2 | 6/2009 | Bacon, Jr. |
| 7,611,251 B2 | 11/2009 | Thakkar |
| 7,980,710 B2 | 7/2011 | Hayashi |
| 2002/0034457 A1 | 3/2002 | Reichert |
| 2002/0061178 A1 | 5/2002 | Winston |
| 2003/0100637 A1 | 5/2003 | Mimura |
| 2003/0118750 A1 | 6/2003 | Bourdelais |
| 2003/0123150 A1 | 7/2003 | Brickey |
| 2003/0170442 A1 | 9/2003 | Kaminsky |
| 2004/0056994 A1 | 3/2004 | Honda |
| 2004/0164325 A1 | 8/2004 | Siegel |
| 2006/0003178 A1 | 1/2006 | Strobel |
| 2006/0019114 A1 | 1/2006 | Thies |
| 2006/0078696 A1 | 4/2006 | Furholz |
| 2006/0082700 A1 | 4/2006 | Gehlsen |
| 2006/0215079 A1 | 9/2006 | Suzuki |
| 2006/0216455 A1 | 9/2006 | Soaft |
| 2006/0246233 A1 | 11/2006 | Fukuda |
| 2006/0275595 A1 | 12/2006 | Thies |
| 2007/0020404 A1 | 1/2007 | Seiberle |
| 2007/0065638 A1 | 3/2007 | Wang |
| 2007/0121211 A1 | 5/2007 | Watanabe |
| 2007/0189038 A1 | 8/2007 | Pokorny |
| 2007/0201246 A1 | 8/2007 | Yeo |
| 2008/0037127 A1 | 2/2008 | Weber |
| 2008/0043490 A1 | 2/2008 | Coleman |
| 2008/0064133 A1 | 3/2008 | Lee |
| 2008/0151375 A1 | 6/2008 | Lin |
| 2008/0192352 A1 | 8/2008 | Laney |
| 2008/0214075 A1 | 9/2008 | Marte et al. |
| 2008/0220554 A1 | 9/2008 | Shigemura |
| 2008/0248312 A1 | 10/2008 | Thies |
| 2008/0305282 A1 | 12/2008 | Inakura |
| 2009/0029145 A1 | 1/2009 | Thies |
| 2009/0122405 A1 | 5/2009 | Mimura |
| 2009/0209028 A1 | 8/2009 | Dong |
| 2009/0246489 A1* | 10/2009 | Yanai et al. ............... 428/212 |
| 2010/0103521 A1 | 4/2010 | Smith |

FOREIGN PATENT DOCUMENTS

| | | |
|---|---|---|
| EP | 2131218 | 12/2009 |
| GB | 1 188 736 | 4/1970 |
| GB | 1476447 | 6/1977 |
| GB | 2254826 | 10/1992 |
| JP | 6347621 | 12/1994 |
| JP | 2005-266343 | 9/2005 |
| JP | 2007-041573 | 2/2007 |
| WO | WO 2004-027474 | 4/2004 |
| WO | WO 2005-052557 | 6/2005 |
| WO | WO 2006-076320 | 7/2006 |
| WO | WO 2006-096258 | 9/2006 |
| WO | WO 2006-120638 | 11/2006 |
| WO | WO 2006-124588 | 11/2006 |
| WO | WO 2008-011919 | 1/2008 |
| WO | WO 2008-098872 | 8/2008 |
| WO | WO 2008-144136 | 11/2008 |
| WO | WO 2008-144644 | 11/2008 |
| WO | WO 2008-144656 | 11/2008 |
| WO | WO 2010-059566 | 5/2010 |
| WO | WO 2010-059568 | 5/2010 |
| WO | WO 2010-059579 | 5/2010 |
| WO | WO 2010-059614 | 5/2010 |
| WO | WO 2010-120422 | 10/2010 |
| WO | WO 2010-120468 | 10/2010 |
| WO | WO 2010-120864 | 10/2010 |
| WO | WO 2010-120871 | 10/2010 |
| WO | WO 2010-120971 | 10/2010 |
| WO | WO 2010-121019 | 10/2010 |

(56) References Cited

FOREIGN PATENT DOCUMENTS

| WO | WO 2010-121054 | 10/2010 |
|---|---|---|
| WO | WO 2011-129831 | 10/2011 |
| WO | WO 2011-129832 | 10/2011 |
| WO | WO 2011-129833 | 10/2011 |

OTHER PUBLICATIONS

ASTM D 4956-07, "Standard Specification for Retroreflective Sheeting for Traffic Control" 2007, pp. 504-515.

ASTM E 808-01 (Reapproved 2009), "Standard Practice for Describing Retroreflection", 2001, pp. 1-10.

ASTM E 810-03 (Reapproved 2008) "Standard Test Method for Coefficient of Retroreflection of Retroreflective Sheeting Utilizing the Coplanar Geometry", 2003, pp. 1-8.

Boisvert, "Influence of Structural Properties of Nanoporous Silica-polymer Materials on Ink Absorption", Nordic Pulp and Paper Research Journal, 2003, vol. 18, No. 2, pp. 210-216.

Brunauer, "Adsorption of Gases in Multimolecular Layers", The Bureau of Chemistry and Soils and George Washington University Feb. 1938, vol. 60, pp. 309-319.

Cornelissen, "Efficient and Cost-effective Polarized-light backlights for LCDs", Proceedings of SPIE, vol. 7058, pp. 1-10, (2008).

Groh, "What is the Lowest Refractive Index of an Organic Polymer?", Macromolecules, 1991, vol. 24, No. 25, pp. 6660-6663.

Haze, "Insight on Color", Applications Note, Jun. 2008, vol. 9, No. 6, pp. 1-4.

Ibn-Elhaj, Optical Polymer Thin Films with Isotropic and Anisotropic Nano-corrugated Surface Topologies, Nature, Apr. 12, 2001, vol. 410, pp. 796-799.

Miyamoto, "Control of Refractive Index of Pressure-Sensitive Adhesives for the Optimization of Multilayered Media", Japanese Journal of Applied Physics, vol. 46, pp. 3978-3980, 2007.

Oliveri, "Fabrication and Characterization of Polymeric Optical Waveguides Using Standard Silicon Processing Technology", IEEE Xplore, Jun. 2005, pp. 1-6.

Patton, "Paint Flow and Pigment Dispersion: A Rheological Approach to Coating and Ink Technology", 2nd Edition, pp. 126-180 (1978).

Peng, "Enhanced Coupling of Light from Organic Light Emitting Diodes Using Nanopourous Films", Journal Applied Physics, Aug. 1, 2004, vol. 96, No. 3, pp. 1649-1654.

Polymer Handbook, edited by Bandrup, Immergut, and Grulke, 4th Edition, Parts I-VIII, (1999).

Shen, "Low Dielectric Constant Silica Films with Ordered Nanoporous Structure", Materials Science and Engineering, 2007, C 27, pp. 1145-1148.

Smith, "Driver-focused Design of Retroreflective Sheeting for Traffic Signs", 87th Annual Meeting of Transportation Research Board, pp. 1-17, Jan. 13-17, 2008.

Sudduth, "Modeling Cluster Voids and Pigment Distribution to Predict Properties and CPVC in Coatings", Part 1: Dry Coating Analysis, Pigment and Resin Technology, 2008, vol. 37, No. 6, pp. 375-388.

"Visual Acuity", NDT Resource Center, Iowa State University [online], [retrieved from the internet on Jun. 24, 2011], URL <http://www.ndt.org/EducationResources/CommunityCollege/Penetrant-Test/Introduction/visualacuity.htm>, 3 pages.

"Visual Acuity", Wikipedia, [online], [retrieved from the internet on Jun. 24, 2011], URL <http://en.wikipedia.org/wiki/Visual_acuity#Visual_acuity_expression>, 13 pages.

Walheim, "Nanophase-Separated Polymer Films as High-performance Antireflection Coatings", Science, Jan. 22, 1999, vol. 283, pp. 520-522.

Yoder, Jr., "Study of Light Deviation Errors in Triple Mirrors and Tetrahedral Prisms", Journal of Optical Society of America, Jul. 1958, vol. 48, No. 7, pp. 496-499.

Yu, "Comparison of Different Measurement Methods for Transmittance Haze", Metrologia, vol. 46, pp. 233-237, (2009). (XP002603289).

International Search Report, PCT/US2010/030984, mailed Oct. 14, 2010, 5 pages.

International Search Report, PCT/US2010/031019, mailed Aug. 4, 2010, 7 pages.

International Search Report, PCT/US2010/031149, mailed Jun. 22, 2010, 6 pages.

International Search Report, PCT/US2010/031225, mailed Aug. 23, 2010, 4 pages.

International Search Report, PCT/US2010/031276, mailed Jun. 18, 2010, 2 pages.

International Search Report, PCT/US2010/031284, mailed Jun. 18, 2010, 2 pages.

International Search Report, PCT/US2010/031290, 3 pages, 2010.

International Search Report, PCT/US2010/031298, mailed Jun. 18, 2010, 3 pages.

* cited by examiner

LIGHTGUIDE WITH OPTICAL FILM CONTAINING VOIDS AND BLACKLIGHT FOR DISPLAY SYSTEM

Cross Reference to Related Applications

This application is a national stage filing under 35 U.S.C. 371 of PCT/US2010/030984, filed on Apr. 14, 2010, which claims priority to U.S. Provisional Application No. 61/169,555, filed on Apr. 15, 2009, the disclosure of which is incorporated by reference in its/their entirety herein.

RELATED APPLICATIONS

This application is related to the following U.S. patent applications and which are incorporated by reference: U.S. Provisional Application No. 61/169,466, titled "Optical Film"; U.S. Provisional Application No. 61/169,521, titled "Optical Construction and Display System Incorporating Same"; U.S. Provisional Application No. 61/169,532, titled "Retroreflecting Optical Construction"; U.S. Provisional Application No. 61/169,549, titled "Optical Film for Preventing Optical Coupling"; U.S. Provisional Application No. 61/169,427, titled "Process and Apparatus for Coating with Reduced Defects"; and U.S. Provisional Application No. 61/169,429, titled "Process and Apparatus for A nanovoided Article".

FIELD OF THE INVENTION

This invention generally relates to backlights that incorporate optical films that exhibit some low-refractive index-like properties. The invention can further be applicable to display systems, such as liquid crystal display systems, that incorporate such backlights.

BACKGROUND

Backlights are used as extended area illumination sources in displays such as liquid crystal displays (LCDs). Backlights typically include one or more lamps, a lightguide for producing an extended area light source by extending light from the lamps over the output surface of the backlight, and one or more light management layers such as prismatic light redirecting layers, brightness enhancement layers, reflective polarizer layers, diffuser layers, mirror layers and retarder layers.

Light propagating in a lightguide is typically extracted by light extraction features provided on a major surface, such as the output surface, of the lightguide.

SUMMARY OF THE INVENTION

Generally, the present invention relates to lightguides. In one embodiment, a lightguide includes a light guiding layer for propagating light by total internal reflection, and a first optical film that is disposed on the light guiding layer. The first optical film includes a plurality of voids, an optical haze that is not less than about 30%, and a porosity that is not less than about 20%. Substantial portions of each two neighboring major surfaces in the lightguide are in physical contact with each other. In some cases, the first optical film has an optical haze that is not less than about 40%, or not less than about 50%. In some cases, the first optical film has an optical haze that is not greater than about 80%, or not greater than about 70%. In some cases, the first optical film has an effective index of refraction that is not greater than about 1.3, or not greater than about 1.2. In some cases, the first optical film includes a binder, a plurality of particles and a plurality of interconnected voids, where the weight ratio of the binder to the plurality of the particles is not less than about 1:2. In some cases, at least 50%, or at least 70%, or at least 90%, of each two neighboring major surfaces in the lightguide are in physical contact with each other.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

Figure 1:
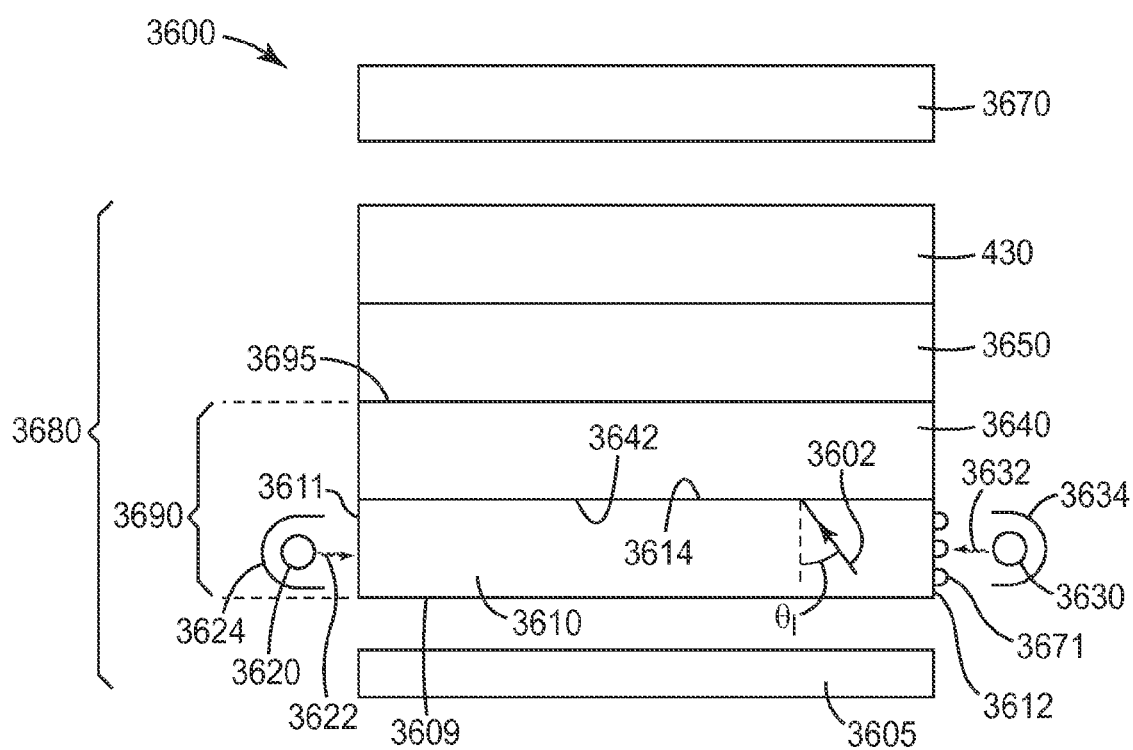
FIG. 1 is a schematic side-view of a display system.

This invention generally relates to backlights that incorporate an optical film that exhibits some low-refractive index-like optical properties. Some disclosed optical films have a high optical haze and/or high diffuse optical reflectance while manifesting some low-index-like optical properties, such as, for example, the ability to support total internal reflection (TIR) or enhance internal reflection (EIR). Such optical films can advantageously extract light from a major surface of a lightguide and, at the same time, at least partially support TIR and/or EIR at the major surface. Furthermore, the optical haze of the optical films can be sufficiently high to effectively mask or hide lamps or light bulbs, scratches, defects, or any other visually apparent component or feature that would be desirable to mask.

Some disclosed optical films include a plurality of interconnected voids or a network of voids dispersed in a binder. The voids in the plurality or network are connected to one another via hollow tunnels or hollow tunnel-like passages. The voids are not necessarily free of all matter and/or particulates. For example, in some cases, a void may include one or more small fiber- or string-like objects that include, for example, a binder and/or nano-particles. Some disclosed optical films include multiple pluralities of interconnected voids or multiple networks of voids where the voids in each plurality or network are interconnected. In some cases, in addition to multiple pluralities of interconnected voids, the disclosed optical films include a plurality of closed or unconnected voids meaning that the voids are not connected to other voids via tunnels.

In general, a void can be a surface void or an interior void. A surface void is located at a surface of the optical film. An interior void are within the interior of the optical film and away from the exterior surfaces of the optical film. As such, an interior void can be a closed void or it can be connected to a major surface via, for example, other voids.

In some cases, an optical film includes surface and interior voids. In some cases, an optical film includes only interior voids.

Some disclosed optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided optical film enhancing internal reflection (EIR), it is meant that the reflectance at the boundary of the voided and non-voided strata of the film or film laminate is greater with the voids than without the voids.

The voids in the disclosed optical films have an index of refraction $n_v$ and a permittivity $\epsilon_v$, where $n_v^2=\epsilon_v$, and the binder has an index of refraction $n_b$ and a permittivity $\epsilon_b$, where $n_b^2=\epsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed optical films are sufficiently thick so that the optical film can reasonably have an effective index that can be expressed in terms of the indices of refraction of the voids and the binder, and the void or pore volume fraction or porosity. In such cases, the thickness of the optical film is not less than about 100 nm, or not less than about 200 nm, or not less than about 500 nm, or not less than about 700 nm, or not less than about 1,000 nm.

When the voids in a disclosed optical film are sufficiently small and the optical film is sufficiently thick, the optical film has an effective permittivity $\epsilon_{eff}$ that can be expressed as:

$$\epsilon_{eff}=f\epsilon_v+(1-f)\epsilon_b \qquad (1)$$

In such cases, the effective index $n_{eff}$ of the optical film can be expressed as:

$$n_{eff}^2=fn_v^2+(1-f)n_b^2 \qquad (2)$$

In some cases, such as when the difference between the indices of refraction of the pores and the binder is sufficiently small, the effective index of the optical film can be approximated by the following expression:

$$n_{eff}=fn_v+(1-f)n_b \qquad (3)$$

In such cases, the effective index of the optical film is the volume weighted average of the indices of refraction of the voids and the binder. For example, an optical film that has a void volume fraction of about 50% and a binder that has an index of refraction of about 1.5, has an effective index of about 1.25.

FIG. 1 is a schematic side-view of a display system 3600 that includes a liquid crystal panel 3670 disposed on a light source or backlight 3680. The backlight includes a lightguide 3690 disposed on a highly reflective back reflector 3605, a light source 3620 housed inside a side reflector 3624 and emitting light 3622, a light source 3630 housed inside a side reflector 3634 and emitting light 3632, and an optical adhesive layer 3650 laminating lightguide 3690 to a reflective polarizer layer 430.

Lightguide 3690 includes a optical film 3640 disposed on a light guiding layer 3610. The light guiding layer guides, primarily by TIR, lights 3622 and 3632 that it receives from respective edges 3611 and 3612 along the length of the lightguide. Optical film 3640 exhibits sufficient low-refractive-index properties to promote TIR within light guiding layer 3610.

At the same time, optical film 3640 is sufficiently light scattering, at least near the interface with the light guiding layer, to extract light from the light guiding layer by at least partially frustrating total internal reflection at the interface.

Substantial portions of neighboring major surfaces of each two neighboring layers in lightguide 3690 are in physical contact with each other. For example, substantial portions of neighboring major surfaces 3642 and 3614 of the two respective neighboring layers 3640 and 3610 in lightguide 3690 are in physical contact with each other. For example, at least 50%, or at least 60%, or at least 70%, or at least 80%, or at least 90%, or at least 95% of the two neighboring major surfaces are in physical contact with each other. In some cases, optical film is coated on major surface 3614 of light guiding layer 3610.

In general, substantial portions of neighboring major surfaces (major surfaces that face each other or are adjacent to each other) of each two neighboring layers in lightguide 3690 are in physical contact with each other. For example, in some cases, there may be one or more additional layers, such as an adhesive layer not expressly shown in FIG. 1, disposed in between light guiding layer 3610 and optical film 3640. In such cases, substantial portions of neighboring major surfaces of each two neighboring layers in lightguide 3690 are in physical contact with each other. In such cases, at least 50%, or at least 60%, or at least 70%, or at least 80%, or at least 90%, or at least 95% of the neighboring major surfaces of each two neighboring layers in the lightguide are in physical contact with each other.

Optical film 3640 can be any optical film that includes a plurality of voids, has sufficient haze, and can support or maintain TIR or EIR at a major surface of lightguide layer 3610. For example, optical film can be any optical film described in U.S. Provisional Application No. 61/169,466, titled "OPTICAL FILM", the disclosure of which is incorporated in its entirety herein by reference.

In some cases, the optical film includes a plurality of interconnected voids and a plurality of particles dispersed in a binder that has an index $n_b$. In some cases, the optical film has an effective index $n_{eff}$ that is not greater than about 1.35, or not greater than about 1.3, or not greater than about 1.2, or not greater than about 1.15, or not greater than about 1.1, or not greater than about 1.05. In some cases, $n_{eff}$ is less than the index of refraction $n_g$ of the light guiding layer by not less than about 0.1, or not less than about 0.2, or not less than about 0.3, or not less than about 0.4. In some cases, the weight ratio of the binder to the plurality of particles is not less than about 1:2, or not less than about 1:1, or not less than about 1.5:1, or not less than about 2:1, or not less than about 2.5:1, or not less than about 3:1, or not less than about 3.5:1, or not less than about 4:1.

In some cases, optical film 3640 has a porosity that is not less than about 20%, or not less than about 30%, or not less than about 40%, or not less than about 50%, or not less than about 60%, or not less than about 70%, or not less than about 80%.

Optical film 3640 has sufficient optical haze to extract light from light guiding layer 3610 while supporting TIR or EIR. For example, in such cases, the optical haze of the optical film is not less than about 20%, or not less than about 30%, or not less than about 40%, or not less than about 50%, or not less than about 60%, or not less than about 70%, or not less than about 80%, or not less than about 90%.

In general, the desired optical haze of optical film 3640 depends on several parameters including the aspect ratio of the lightguide (the ratio L/H, where L and H are the length and thickness of light guiding layer 3610, respectively), requirements regarding light extraction efficiency and uniformity, the optical reflectance of the optical film, and whether or not the light guiding layer includes additional light extracting features such as molded surface features or printed dots on, for example, the bottom surface 3609 of the light guiding layer. In some cases, the optical haze of the optical film is in a range from about 30% to about 70%. In such cases, an optical haze of greater than about 70% can result in non-uniform light extraction, and an optical haze of less than about 30% does not provide for sufficient defect or lamp masking or hiding.

Figure 2:
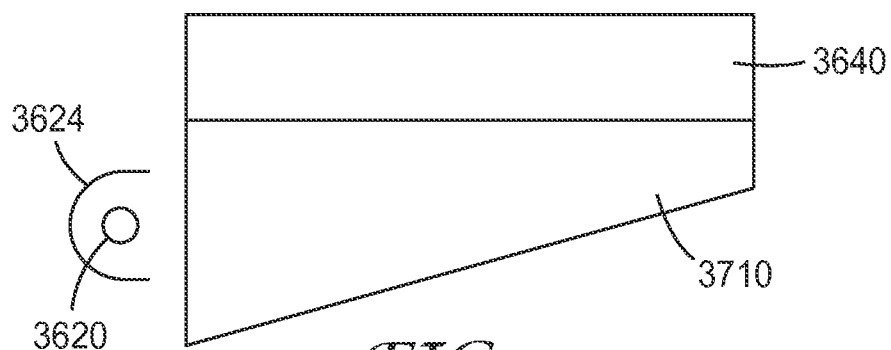
FIG. 2 is a schematic side-view of a wedge-shape light guiding layer.

In the exemplary display system 3600, light guiding layer 3610 has uniform thickness across the layer. In some cases, light guiding layer can have non-uniform thickness across the layer. For example, FIG. 2 is a schematic side-view of a wedge-shape light guiding layer 3710, where the thickness decreases with increasing distance from lamp 3620.

Returning back to FIG. 1, lightguide 3690 includes a light emitting surface 3695 that is a substantial portion of the top major surface of optical film 3640. For example, light emitting surface 3695 includes at least about 50%, or at least about 60%, or at least about 70%, or at least about 80%, or at least about 90% of the top major surface of the optical film. In some cases, uniformity of light emitted by the light emitting surface is not less than about 50%, or not less than about 60%, or not less than about 70%, or not less than about 80% across the light emitting surface, where uniformity is defined as the ratio of the minimum emitted light intensity to the maximum emitted light intensity times 100.

Reflective polarizer layer 430 substantially reflects light that has a first polarization state and substantially transmits light that has a second polarization state, where the two polarization states are mutually orthogonal. For example, the average reflectance of reflective polarizer 430 in the visible for light that is substantially reflected by the reflective polarizer is at least about 50%, or at least about 60%, or at least about 70%, or at least about 80%, or at least about 90%, or at least about 95%. As another example, the average transmittance of reflective polarizer 430 in the visible for light that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 430 substantially reflects light having a first linear polarization state (for example, along the x-direction) and substantially transmits light having a second linear polarization state (for example, along the z-direction).

Any suitable type of reflective polarizer may be used for reflective polarizer layer 430 such as, for example, a multilayer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, reflective polarizer layer 430 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer layer 430 and an incident light in the unmatched polarization state is substantially reflected by reflective polarizer layer 430. In some cases, an MOF reflective polarizer layer 430 can include a stack of inorganic dielectric layers.

As another example, reflective polarizer layer 430 can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, reflective polarizer layer 430 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, layer 430 can be a non-polarizing partial reflector. For example, layer 430 can include a partially reflective metal and/or dielectric layer. In some cases, layer 430 can have a structured surface.

Liquid crystal panel 3670 includes, not expressly shown in FIG. 1, a layer of liquid crystal disposed between two panel plates, an upper light absorbing polarizer layer disposed above the liquid crystal layer, and a lower absorbing polarizer disposed below the liquid crystal layer. The upper and lower light absorbing polarizers and the liquid crystal layer, in combination, control the transmission of light from reflective polarizer layer 430 through liquid crystal panel 3670 to a viewer facing the display system.

Back reflector 3605 can be any type reflector that may be desirable and/or practical in an application. For example, the back reflector can be a specular reflector, a semi-specular or semi-diffuse reflector, or a diffuse reflector, such as those disclosed in International Patent Application No. PCT/US 2008/064115, filed May 19, 2008, claiming priority from Provisional U.S. Patent Application No. 60/939,085, filed May 20, 2007, both incorporated herein by reference in their entirety. For example, the reflector can be an aluminized film or a multi-layer polymeric reflective film, such as an enhanced specular reflector (ESR) film (available from 3M Company, St. Paul, Minn.). As another example, back reflector 3605 can be a diffuse reflector having a white appearance.

Back reflector 3605 is proximate major bottom surface 3609 of light guiding layer 3610. Back reflector 3605 reflects light that exits the guiding layer from surface 3609 back toward lightguide 3690. In some cases, the back reflector is partially reflective and partially transmissive. In some cases, the back reflector can be structured, for example, have a structured surface.

Optical adhesive layer 3650 can be any optical adhesive that may be desirable and/or available in an application. Optical adhesive layer 3650 is of sufficient optical quality and light stability such that, for example, the adhesive layer does not yellow with time or upon exposure to weather so as to degrade the optical performance of the adhesive and the optical film. In some cases, optical adhesive layer 3650 can be a substantially clear optical adhesive meaning that the adhesive layer has a high specular transmittance and a low diffuse transmittance. For example, in such cases, the specular transmittance of optical adhesive layer 3650 is at least about 70%, or at least about 80%, or at least about 90%, or at least about 95%. In some cases, optical adhesive layer 3650 can be a substantially diffuse optical adhesive, meaning that the adhesive layer has a high diffuse transmittance and a low specular transmittance. For example, in such cases, the diffuse transmittance of optical adhesive layer 3650 is at least about 60%, or at least about 70%, or at least about 80%. In some cases, optical adhesive layer 3650 can be a substantially polarization-preserving diffuse adhesive.

Exemplary optical adhesives include pressure sensitive adhesives (PSAs), heat-sensitive adhesives, solvent-volatile adhesives, and UV-curable adhesives such as UV-curable optical adhesives available from Norland Products, Inc.

Exemplary PSAs include those based on natural rubbers, synthetic rubbers, styrene block copolymers, (meth)acrylic block copolymers, polyvinyl ethers, polyolefins, and poly (meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin.

Other exemplary silicone PSAs include a polydiorganosiloxane polyoxamide and an optional tackifier.

Figure 11:
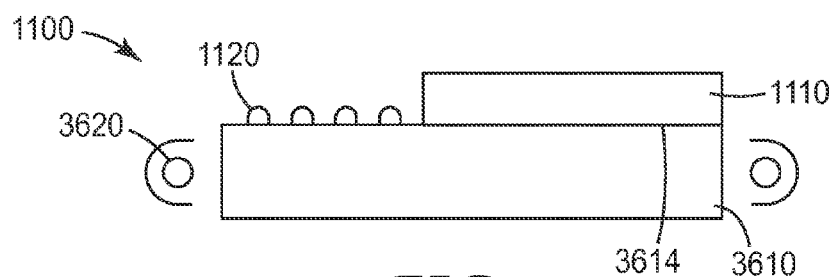
FIG. 11 is a schematic side-view of another lightguide.

In the exemplary lightguide 3690, optical film 3640 substantially extends the entire light emitting surface 3695. In some cases, the optical film may cover only a portion of the light emitting surface. For example, FIG. 11 is a schematic side-view of a lightguide 1100 that includes an optical film 1110 disposed only on a portion of major surface 3614 of light guiding layer 3610. In the exemplary lightguide 1100, light extraction features 1120 are disposed on another portion of major surface 3614. Optical film 1110 can be similar to optical film 3640.

Figure 8:
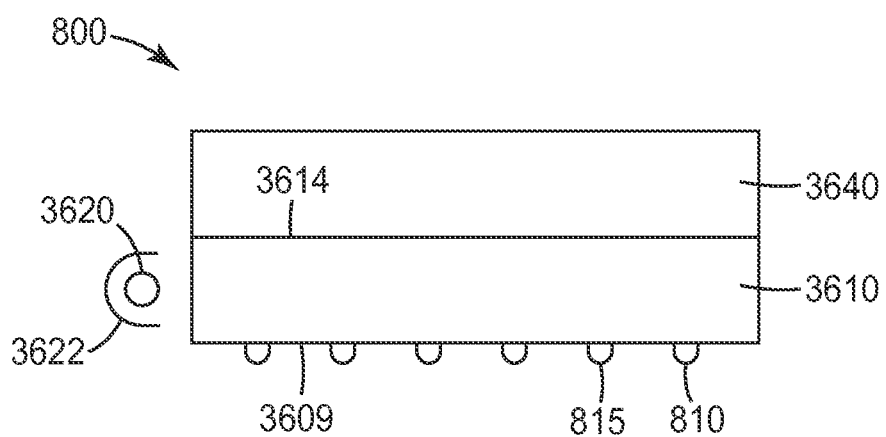
FIG. 8 is a schematic side-view of a lightguide.
Figure 9:
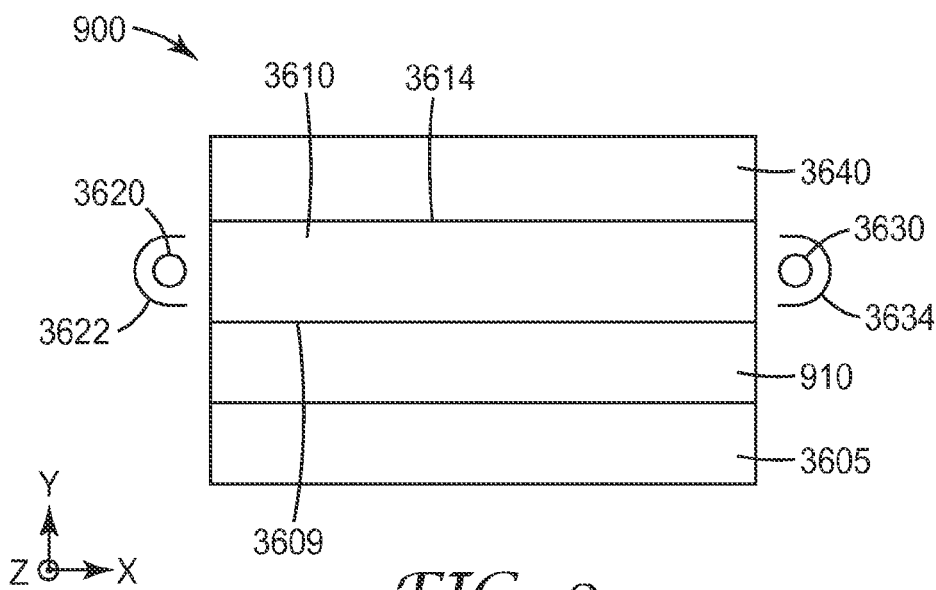
FIG. 9 is a schematic side-view of another lightguide.

The exemplary lightguide 3690 in FIG. 1 does not include light extraction means other than optical film 3640. In some cases, the lightguide can have multiple extraction means. For example, FIG. 8 is a schematic side-view of a lightguide 800 that includes light guiding layer 3610, optical film 3640 disposed on top major surface 3614 of the light guiding layer and light extraction means 810 disposed on bottom major surface 3609 of the light guiding layer. Light extraction means 810 includes a plurality of discrete light extraction features 815. Optical film 3640 is the first light extracting means in lightguide 800, and light extraction features 815 are the second light extracting means in the lightguide. In general, second light extraction means 810 can be any extraction means that may be desirable in an application. For example, light extraction means 810 can be a roughened bottom major surface 3609. As another example, light extraction features 815 can be printed dots or extraction features, such as lenslets, where, in some cases, the extraction features can be integral to light guiding layer 3610. As yet another example, light extraction means 810 can be an optical film similar to optical film 3640. For example, FIG. 9 is a schematic side-view of a lightguide 900 that includes a second optical film 910 disposed on bottom major surface 3609, and between light guiding layer 3610 and back reflector 3605.

In the exemplary lightguide 900, back reflector 3605 is attached to optical film 910 by, for example, coating the optical film on the back reflector or lamination the back reflector to the optical film. Lightguide 900 emits light through top major surface 3614 and bottom major surface 3609. Light that is emitted downward through surface 3609 is reflected back in the upward direction by back reflector 3605.

Figure 10:
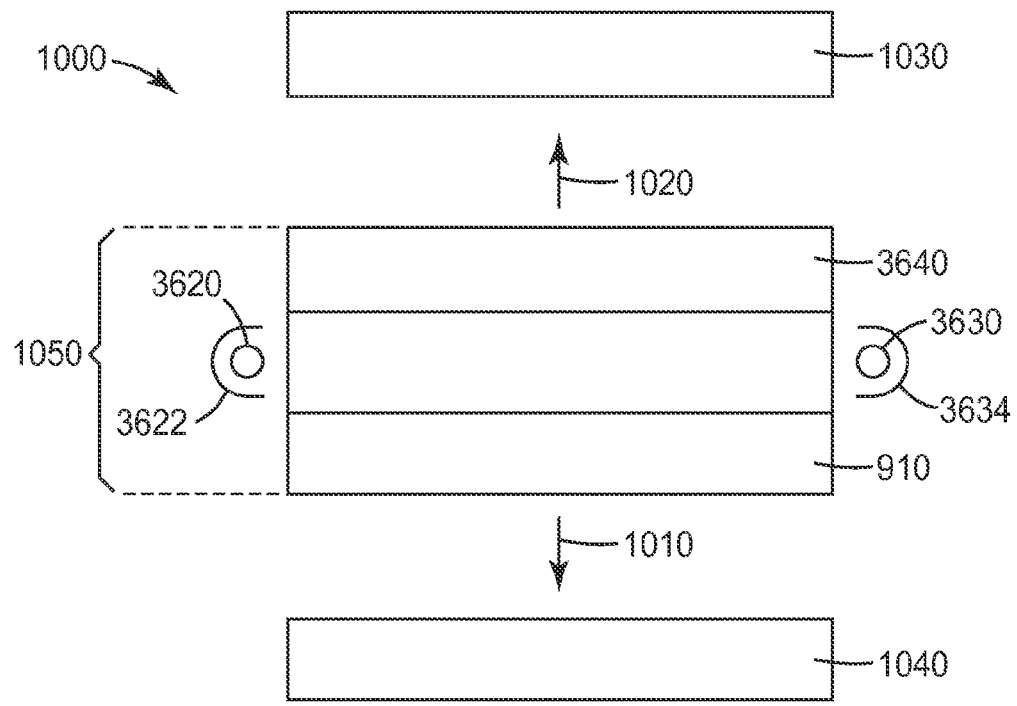
FIG. 10 is a schematic side-view of a display system.

FIG. 10 is a schematic side-view of a display system 1000 that includes a lightguide 1050 disposed between a first liquid crystal panel 1030 and a second liquid crystal panel 1040. Lightguide 1050 emits light 1010 for illuminating liquid crystal panel 104 and light 1020 for illuminating liquid crystal panel 1030.

Referring back to FIG. 1, the exemplary backlight 3680 includes a reflective polarizer layer laminated to optical film 3650 via optical adhesive layer 3650. In general, backlight 3680 can include one or more light management films such as, a reflective polarizer, a light redirecting film such as a brightness enhancement film (for example, BEF available from 3M Company, Saint Paul Minn.), a turning film (for example, an inverted BEF), an optical diffuser, or any other light management film that may be desirable in an application. For example, in some cases, reflective polarizer 430 can be replaced with a prismatic brightness enhancement film, a light management film that includes a plurality of linear cylindrical lenses, or a light management film that includes a plurality of particles, such as spherical particles, disposed on a surface.

In the exemplary lightguide 3690 in FIG. 1, light guiding layer 3610 receives light from two edges or sides 3611 and 3612. In general, the light guiding layer can receive light from any number of edges or sides, such as from one, two, three, or four edges or sides. In some cases, one or more edges of the light guiding layer that do not receive light can be made reflective to prevent optical loss. For example, an optically diffusive film, that may have a white appearance, can be attached to such an edge to reflect light that would otherwise exit the guiding layer back for extraction toward the emitting surface.

In some cases, one or more light receiving edges of light guiding layer 3610 can include surface features, such as molded surface structures, to spread the light that enters the light guiding layer from the lamps. For example, edge 3612 includes surface features 3671 for spreading light 3632 inside the light guiding layer.

Light guiding layer 3610 can be made of any optical material that may be desirable in an application, such as for example, any glass or any polymer that may be desirable in an application. For example, light guiding layer 3610 can be made of polycarbonate, acrylic, or cyclo olefin polymer (COP) (for example, available from Zeon chemicals L.O., Louisville, Ky.).

Backlight 3680 can have any shape or form that may be desirable in an application. For example, the backlight can have a square shape, or a rectangular shape, or a circular shape. As another example, the edges of light guiding layer can be straight or curved. As yet another example, backlight 3680 can be planar or curved.

Lamps 3620 and 3630 can be any type lamp that may be desirable in an application. For example, the lamps can be extended diffuse sources such as cold cathode fluorescent lamps (CCFLs), smaller area solid state light sources such as light emitting diodes (LEDs), or lasers.

Backlight or light source 3680 can be used in any desirable application. Exemplary applications include signage, displays such as liquid crystal displays, luminaires, and license plates.

Figure 12A:
FIGS. 12A-12D are schematic side-view representations of optical constructions at intermediate stages or steps in a process for fabricating a backlight.
Figure 12B:
Figure 12C:
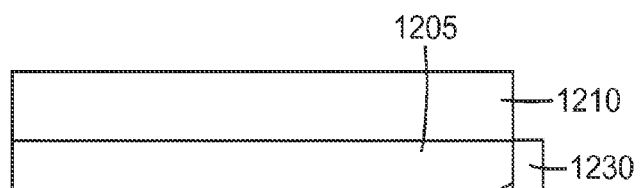
Figure 12D:
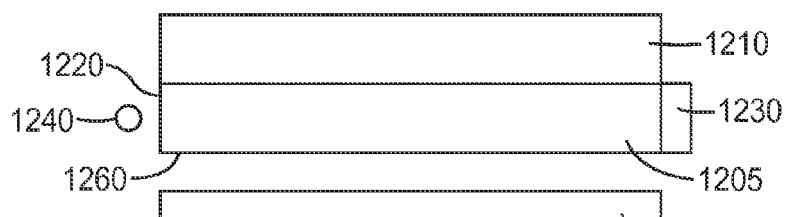

Backlight 3680 can be produced using any fabrication method that may be desirable in an application. For example, an optical film 1210 is coated on a low loss substrate 1205 as shown schematically in FIG. 12A. Optical film 1210 can be any optical film disclosed herein. For example, optical film 1210 can be similar to optical film 3640. Next, the construction in FIG. 12A is cut to a desired size and shape and one or more of the edges are polished as shown schematically in FIG. 12B. Edges 1220 and 1225 have been polished. Next, as shown schematically in FIG. 12C, a reflective film 1230 is attached, such as laminated, to edge 1225. Next, as shown schematically in FIG. 12D, a lamp 1240 is disposed along edge 1220 of the substrate and a back reflector 1250 is disposed approximate major back surface 1260 of substrate 1205. In the construction shown in FIG. 12D, substrate 1202 is the guiding layer and optical film 1210 provides TIR and light extraction means.

Figure 13:
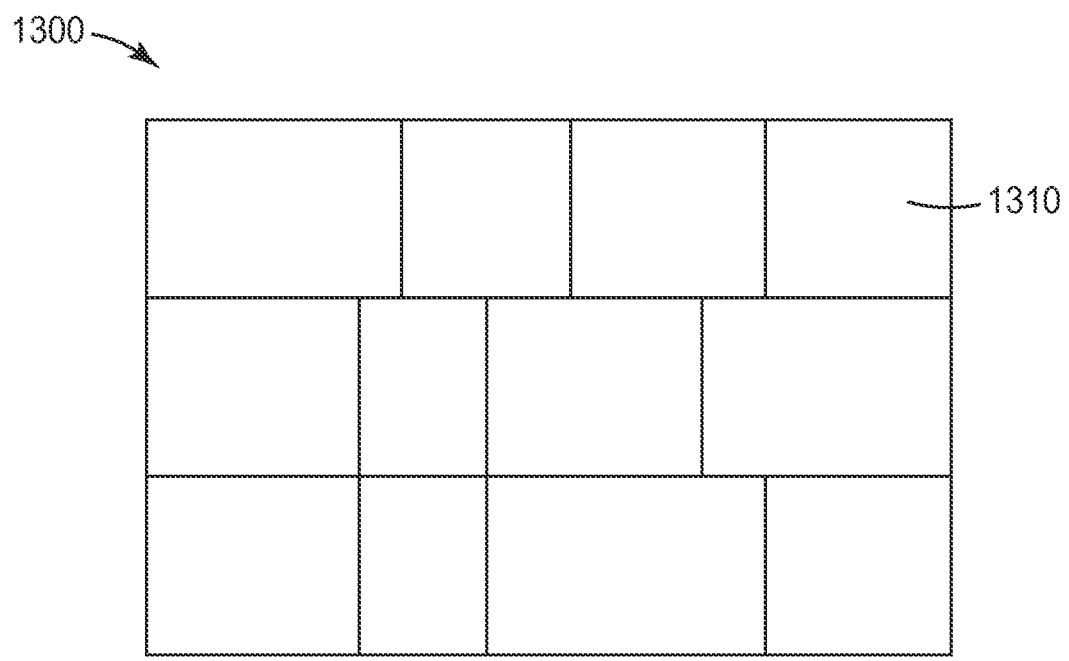
FIG. 13 is a schematic top-view of a display system.

The exemplary display system 3600 includes a single display system. In general, a display system can include one or more displays. For example, FIG. 13 is a schematic top-view of a display system 1300 that displays an image and includes a plurality of discrete displays 1310. Each discrete display 1310 can be individually controlled. For example, the output light intensity of each discrete display can be individually controlled, meaning that the output intensity of one discrete display can be changed without changing the output intensities of the other discrete displays. At least one of the discrete displays includes or is display system 3600. In some cases, at least one discrete display 1310 includes a backlight disclosed herein, such as backlight 3680. In some cases, each discrete display 1310 displays a different portion of the image that is displayed by display system 1300.

Some of the advantages of the disclosed films, layers, constructions, and systems are further illustrated by the following examples. The particular materials, amounts and dimensions recited in this example, as well as other conditions and details, should not be construed to unduly limit the present invention.

EXAMPLE A

A coating solution "A" was made. First, a "906" composition (available from 3M Company, St. Paul, Minn.) was obtained. The 906 composition included: 18.4 wt % 20 nm silica particles (Nalco 2327) surface modified with methacryloyloxypropyltrimethoxysilane (acrylate silane), 25.5 wt % Pentaerthritol tri/tetra acrylate (PETA), 4.0 wt % N,N-dimethylacrylamide (DMA), 1.2 wt % Irgacure 184, 1.0 wt % Tinuvin 292, 46.9 wt % solvent isopropanol, and 3.0 wt % water. The 906 composition was approximately 50% solid by weight. Next, the 906 composition was diluted to 35 wt % solid with solvent 1-methoxy 2-propanol resulting in coating solution A.

EXAMPLE B

A coating solution "B" was made. First, 360 g of Nalco 2327 colloidal silica particles (40% wt solid and an average particle diameter of about 20 nanometers) (available from Nalco Chemical Company, Naperville Ill.) and 300 g of solvent 1-methoxy-2-propanol were mixed together under rapid stirring in a 2-liter three-neck flask that was equipped with a condenser and a thermometer. Next, 22.15 g of Silquest A-174 silane (available from GE Advanced Materials, Wilton Conn.) was added. The mixture was stirred for 10 min. Next, an additional 400 g of 1-methoxy-2-propanol was added. The mixture was heated at 85° C. for 6 hours using a heating mantle. The resulting solution was allowed to cool down to room temperature. Next, most of water and 1-methoxy-2-propanol solvents (about 700 g) were removed using a rotary evaporator under a 60° C. water-bath. The resulting solution was 44% wt A-174 modified 20 nm silica clear dispersed in 1-methoxy-2-propanol. Next, 70.1 g of this solution, 20.5 g of SR 444 (available from Sartomer Company, Exton Pa.), 1.375 g of photoinitiator Irgacure 184 (available from Ciba Specialty Chemicals Company, High Point N.C.), and 80.4 g of isopropyl alcohol were mixed together by stirring to form a homogenous coating solution B.

EXAMPLE C

A coating solution "C" was made. First, 309 g of Nalco 2327 (40% wt solid) and 300 g of 1-methoxy-2-propanol were mixed together under rapid stirring in a 2-liter three-neck flask that was equipped with a condenser and a thermometer. Next, 9.5 g of Silquest A-174 and 19.0 g of Siquest A-1230 were added, and the resulting mixture was stirred for 10 min. The mixture was heated at 80° C. for 1 hour using a heating mantle. Next, an additional 400 g of 1-mothoxy-2-propanol was added. The mixture was kept at 80° C. for 16 hours. The resulting solution was allowed to cool down to room temperature. Next, most of water and 1-methoxy-2-propanol solvents (about 700 grams) were removed using a rotary evaporator under a 60° C. water-bath. The resulting solution was 48.7 wt % A174/A1230 modified 20 nm silica clear dispersed in 1-methoxy-2-propanol. Next, 63.4 g of this solution, 20.5 g of SR 444, 1.32 g of the photoinitiator Irgacure 184, and 87.1 g of isopropyl alcohol were mixed together by stirring to form a homogenous coating solution C.

EXAMPLE D

A coating solution "D" was made. 300 g of Nalco 2329 silica particles (40% wt solid) (with an average particle size of 75 nm, available from Nalco Chemical Company, Naperville Ill.) and 300 g of 1-methoxy-2-propanol were mixed together under rapid stirring in a 1-liter flask that was equipped with a condenser and a thermometer. Next, 7.96 g of Silquest A-174 was added. The resulting mixture was stirred for 10 min. Next, an additional 400 g of 1-methoxy-2-propanol was added. The resulting mixture was heated at 85° C. for 6 hours using a heating mantle. The resulting solution was allowed to cool down to room temperature. Next, most of water and 1-methoxy-2-propanol solvents (about 630 g) were removed using a rotary evaporator under a 60° C. water-bath. The resulting solution was 34. 6 wt % A-174 modified 75 nm silica dispersed in 1-methoxy-2-propanol. Next, 135.5 g of this solution, 31.2 g of SR444, 1.96 g of the photoinitiator Irgacure 184, and 93.3 g of isopropyl alcohol were mixed together by stirring to form a homogenous coating solution D.

EXAMPLE E

A coating procedure "E" was developed. First, a coating solution was syringe-pumped at a rate of 3 cc/min into a 10.2 cm (4-inch) wide slot-type coating die. The slot coating die uniformly distributed a 10.2 cm wide coating onto a substrate moving at 5 ft/min (152 cm/min).

Next, the coating was polymerized by passing the coated substrate through a UV-LED cure chamber that included a quartz window to allow passage of UV radiation. The UV-LED bank included a rectangular array of 160 UV-LEDs, 8 down-web by 20 cross-web (approximately covering a 10.2 cm×20.4 cm area). The LEDs (available from Cree, Inc., Durham N.C.) operated at a nominal wavelength of 385 nm, and were run at 45 Volts at 8 Amps, resulting in a UV-A dose of 0.212 joules per square cm. The UV-LED array was powered and fan-cooled by a TENMA 72-6910 (42V/10A) power supply (available from Tenma, Springboro Ohio). The UV-LEDs were positioned above the quartz window of the cure chamber at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coated substrate to a drying oven at 150° F. for 2 minutes at a web speed of 5 ft/min. Next, the dried coating was post-cured using a Fusion System Model 1300P configured with an H-bulb (available from Fusion UV Systems, Gaithersburg Md.). The UV Fusion chamber was supplied with a flow of nitrogen that resulted in an oxygen concentration of approximately 50 ppm in the chamber.

EXAMPLE F

A coating procedure "F" was developed. First, a coating solution was syringe-pumped at a rate of 2.7 cc/min into a 20.3 cm (8-inch) wide slot-type coating die. The slot coating die uniformly distributed a 20.3 cm wide coating onto a substrate moving at 5 ft/min (152 cm/min).

Next, the coating was polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 10 Amps, resulting in a UV-A dose of 0.108 joules per square cm. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. for 2 minutes at a web speed of 5 ft/min. Next, the dried coating was post-cured using a Fusion System Model 1300P configured with an H-bulb (available from Fusion UV Systems, Gaithersburg Md.). The UV Fusion chamber was supplied with a flow of nitrogen that resulted in an oxygen concentration of approximately 50 ppm in the chamber.

EXAMPLE 1

Figure 3:
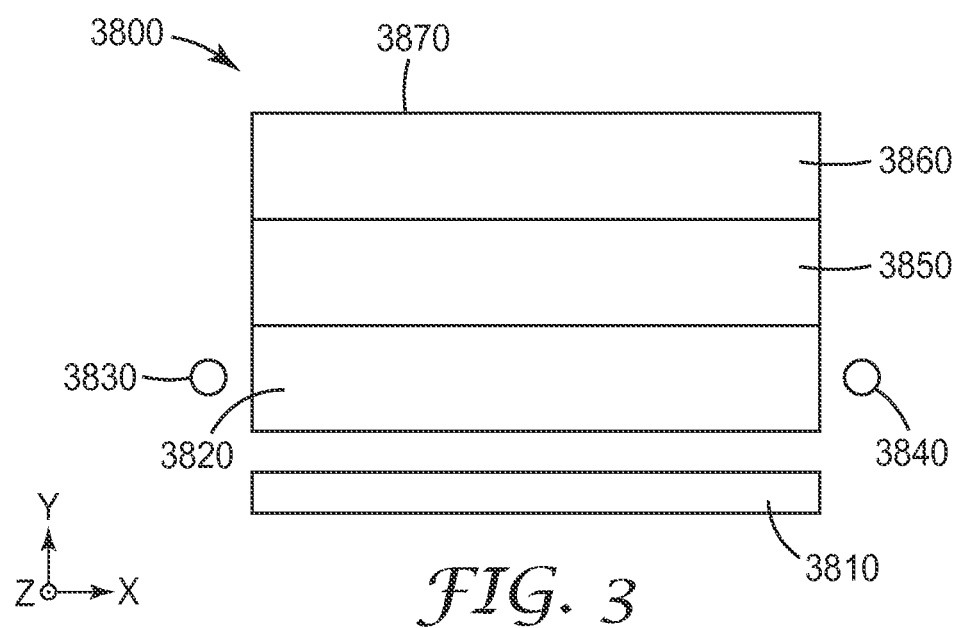
FIG. 3 is a schematic side-view of a backlight.

A backlight 3800, a schematic side-view of which is shown in FIG. 3, was made. Backlight 3800 included a back reflector 3810, a lightguide 3820, lamps 3830 and 3840, and a reflective polarizer layer 3860 laminated to the backlight with an optical adhesive layer 3850.

Reflective polarizer layer 3860 had a pass axis along the z-axis. The average on-axis (along the y-direction) reflectivity of the reflecting polarizer layer for incident light polarized along the z-axis (the pass axis) was about 68%, and the average on-axis (along the y-direction) reflectivity of the reflecting polarizer layer for incident light polarized along the x-axis (the block axis) was about 99.2%. The reflective polarizer layer was made as described in International Publication No. WO 2008/144656 (attorney docket no. 63274WO004 filed on May 19, 2008), the disclosure of which is incorporated in its entirety herein by reference.

The reflective polarizer layer included 274 alternating microlayers of birefringent 90/10 coPEN material and Eastman Neostar Elastomer FN007 (available from Eastman Chemical, Kingsport Tenn.). The 274 alternating microlayers were arranged in a sequence of ¼ wave layer pairs, where the thickness gradient of the layers was designed to provide a strong reflection resonance broadly and uniformly across a bandwidth from approximately 400 nm to 1050 nm for one polarization axis, and a weaker reflection resonance broadly and uniformly across a bandwidth from approximately 400 nm to 900 nm for the orthogonal axis. Two 5 micron thick skin layers of PET-G were disposed on the outside surfaces of the coherent altering microlayer stack. The overall thickness of the reflective polarizer layer, including the alternating microlayers, the protective boundary layers and the skin layers, was approximately 40 microns. The refractive indices, measured at 633 nm, for the alternating 137 microlayers of 90/10 coPEN were $n_{x1}=1.805$, $n_{y1}=1.620$, and $n_{z1}=1.515$; and the indices for the 137 microlayers of FN007 were $n_{x2}=n_{y2}=n_{z2}=1.506$.

Optical adhesive layer 3850 was optically clear adhesive OCA 1873 available from 3M. Lightguide 3820 was a unitary solid light. The lightguide was about 6 mm thick (y-direction), 472 mm wide (z-direction), and 306 mm long (x-direction).

Back reflector 3810 is an ESR film available from 3M. There was a small air gap between the solid lightguide and the back reflector. Each of lamps 3830 and 3840 included 78 LEDs placed near a corresponding edge of the solid lightguide and arranged regularly along the width of the solid lightguide.

The luminance distribution as a function of viewing angle, axial luminance (in units of nits), the half-luminance angle (in the xy-plane), and the extinction ratio of lightguide 3800 was measured using an Autronic Conoscope Conostage 3 (available from Autronic-Melchers GmbH, Karlsruhe, Germany). Before making the measurements, a linear absorbing polarizer, not shown expressly in FIG. 3, was placed on top of the reflective polarizer layer with its pass-axis parallel to the pass-axis of the reflective polarizer. The extinction ratio was $I_1/I_2$, where $I_1$ was the measured axial luminance when the two pass-axes were parallel, and $I_2$ was the measured axial luminance when the two pass-axes were crossed.

Figure 4:
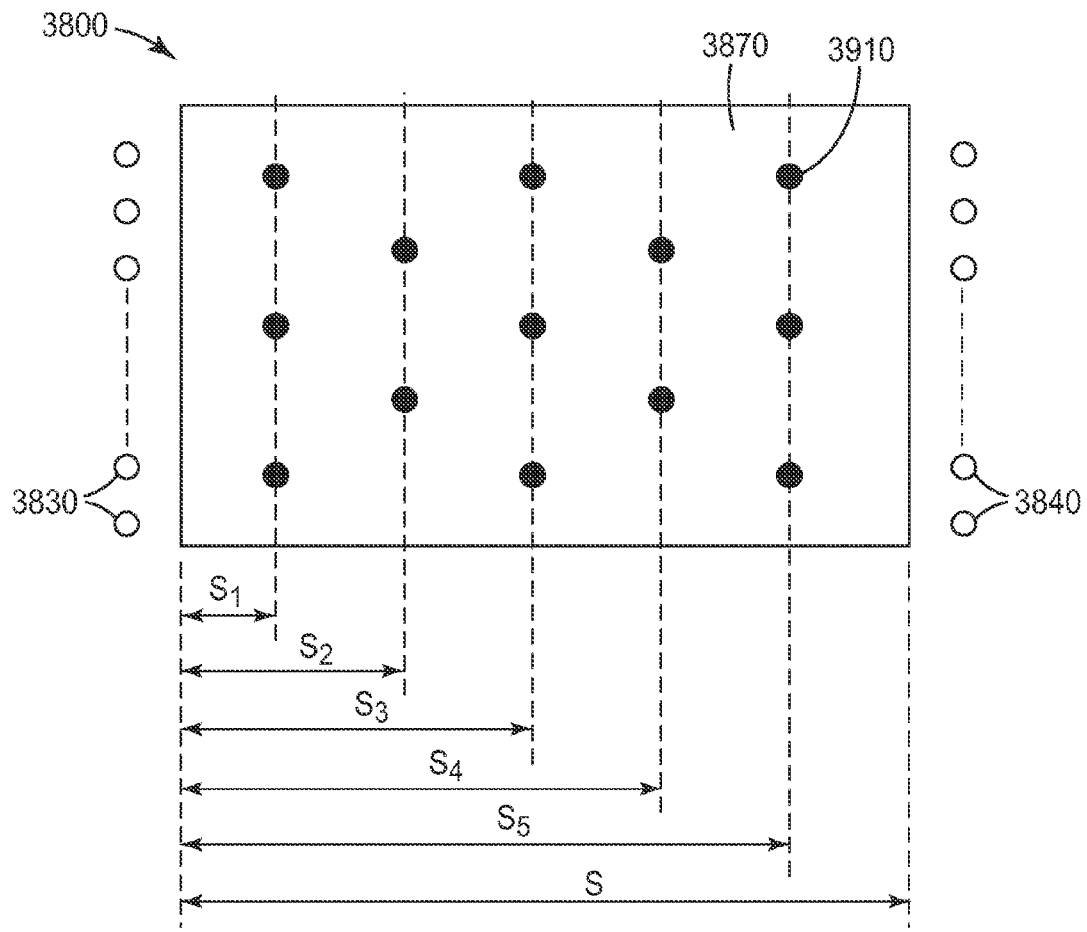
FIG. 4 is a schematic top-view of a backlight indicating locations at which the on-axis brightness of the backlight are measured.
Figure 6A:
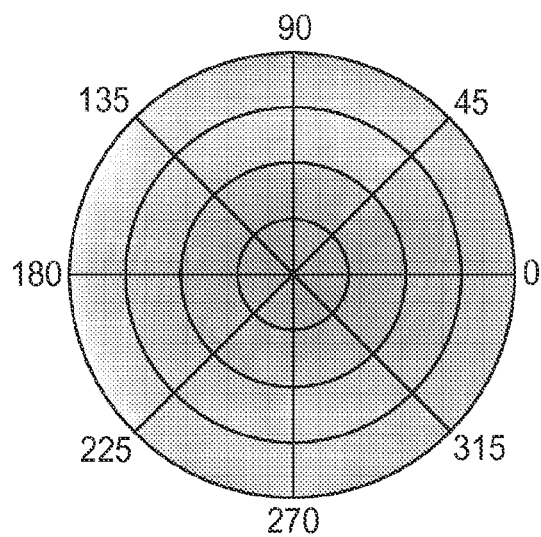
FIGS. 6A-6F are grayscale conoscopic image of the measured luminance of different backlights as a function of viewing angle.

Brightness uniformity of backlight 3800 was measured by recording the on-axis luminance of the backlight at 13 different locations as illustrated in FIG. 4. In particular, FIG. 4 is a schematic top-view of backlight 3800, where the 13 measurement points 3910 are the locations at which on-axis brightness of the backlight were measured. Surface 3870 is the top surface of reflective polarizer layer 3860. The $S_1/S$, $S_2/S$, $S_3/S$, $S_4/S$, and $S_5/S$ were 0.1, 0.3, 0.5, 0.7, and 0.9, respectively, where S was the length of the lightguide (472 mm). Uniformity was defined as $J_1/J_2 \times 100$, where $J_1$ was the minimum of the 13 luminance measurements and $J_2$ was the maximum of the 13 luminance measurements. The measurement results are summarized in Table I. FIG. 6A is a grayscale conoscopic image of the measured luminance of backlight 3800 as a function of viewing angle. The grid overlaying the image is provided for reference purposes to show the azimuthal angle ϕ ranging from 0 to 360 degrees, and the polar angle θ ranging from 0 at the center to more than 80 degrees at the periphery, with concentric circles provided for each 20 degree increment of θ.

TABLE I

Optical performance properties in Examples 1-6

| Example No. | Optical Haze (%) | Axial Luminance (Nits) | Vertical Viewing Angle (Degrees) | Extinction Ratio | Uniformity (%) |
|---|---|---|---|---|---|
| 1 | — | 58 | >80 | 3 | 51 |
| 2 | 9 | 478 | 80 | 65 | 62 |
| 3 | 21 | 920 | 65 | 84 | 70 |
| 4 | 42 | 997 | 65 | 108 | 70 |
| 5 | 55 | 1185 | 60 | 110 | 82 |
| 6 | 90 | 890 | 60 | 102 | 61 |

EXAMPLE 2

Figure 5:
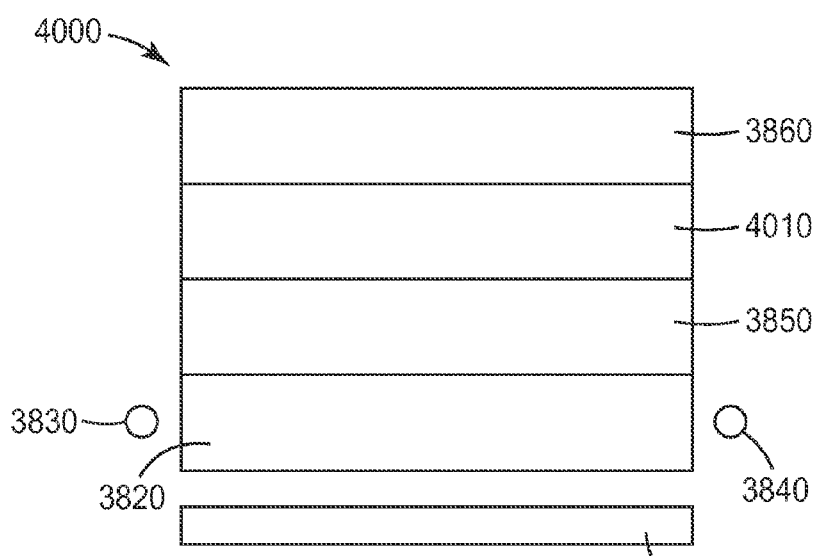
FIG. 5 is a schematic side-view of another backlight.

A backlight 4000, a schematic side-view of which is shown in FIG. 5, was made. Backlight 4000 was similar to backlight 3800 except that an optical film 4010 was disposed between optical adhesive layer 3850 and reflective polarizer layer 3860.

Figure 6B:
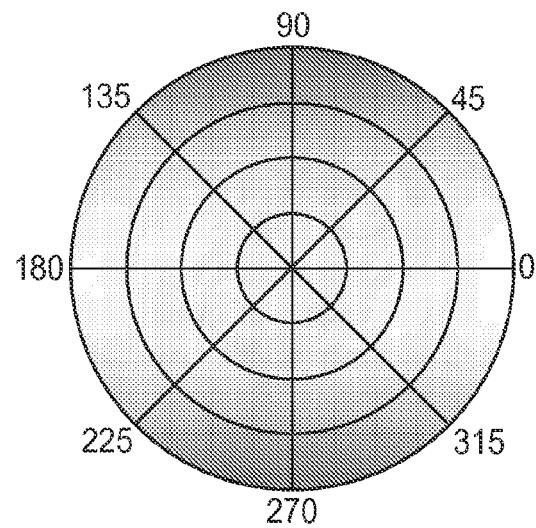

Optical film 4010 was made by coating solution B from Example B on reflective polarizer layer 3860 (the same as the reflective polarizer in Example 1) using the coating method described in Example F, except that the syringe pump rate was 6 cc/min and the LEDs were run at 13 Amps (resulting in a UV-A dose of 0.1352 joules per square cm). The index of the resulting optical film was about 1.22. The optical haze of the optical film was 9%. The thickness of the optical film was about 5 microns. Next, optically clear adhesive OCA 1873 layer 3850 was used to laminate the optical film to lightguide 3820. Measurements similar to those described in Example 1 were made and are summarized in Table I. FIG. 6B is a grayscale conoscopic image of the measured luminance of the backlight as a function of viewing angle.

EXAMPLE 3

Figure 6C:
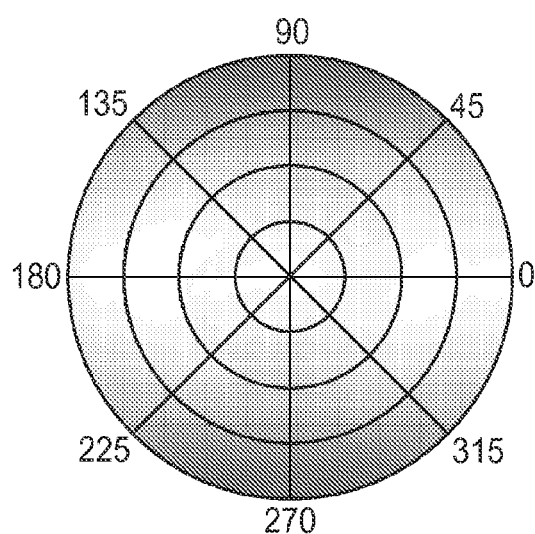

A backlight 4000 was made. The backlight was similar to the backlight made in Example 2, except that optical film 4010 was made by coating solution C from Example C on reflective polarizer layer 3860 (the same as the reflective polarizer in Example 1) using the coating method described in Example F, except that the syringe pump rate was 1.5 cc/min and the LEDs were run at 13 Amps (resulting in a UV-A dose of 0.1352 joules per square cm). The index of the resulting optical film was about 1.25. The optical haze of the optical film was 20%. The thickness of the optical film was about 5 microns. Next, optically clear adhesive OCA 1873 layer 3850 was used to laminate the optical film to lightguide 3820. Measurements similar to those described in Example 1 were made and are summarized in Table I. FIG. 6C is a grayscale conoscopic image of the measured luminance of the backlight as a function of viewing angle.

EXAMPLE 4

Figure 6D:
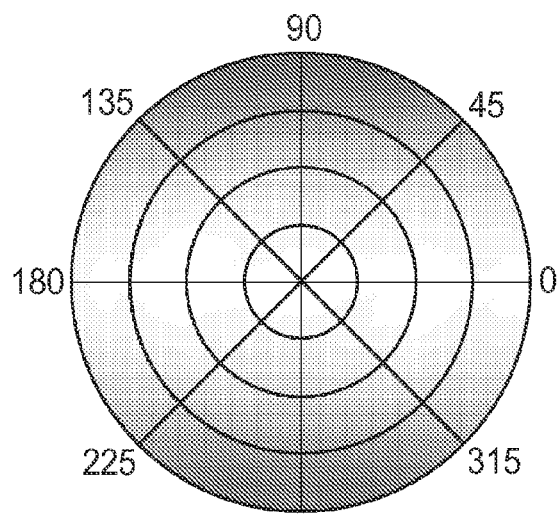

A backlight 4000 was made. The backlight was similar to the backlight made in Example 2, except that optical film 4010 was made by coating solution C from Example C on reflective polarizer layer 3860 (the same as the reflective polarizer in Example 1) using the coating method described in Example F, except that the LEDs were run at 9 Amps (resulting in a UV-A dose of 0.0936 joules per square cm). The index of the resulting optical film was about 1.18. The optical haze of the optical film was 40%. The thickness of the optical film was about 5 microns. Next, optically clear adhesive OCA 1873 layer 3850 was used to laminate the optical film to lightguide 3820. Measurements similar to those described in Example 18 were made and are summarized in Table I. FIG. 6D is a grayscale conoscopic image of the measured luminance of the backlight as a function of viewing angle.

EXAMPLE 5

Figure 6E:
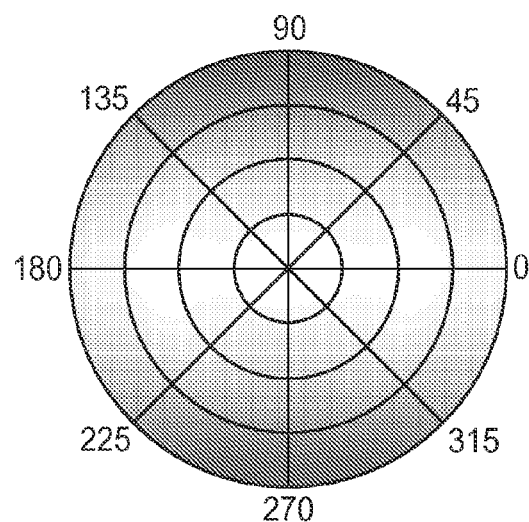

A backlight 4000 was made. The backlight was similar to the backlight made in Example 2, except that optical film 4010 was made by coating solution C from Example C on reflective polarizer layer 3860 (the same as the reflective polarizer in Example 1) using the coating method described in Example F, except that the LEDs were run at 6 Amps (resulting in a UV-A dose of 0.0624 joules per square cm). The index of the resulting optical film was about 1.17. The optical haze of the optical film was 60%. The thickness of the optical film was about 5 microns. Next, optically clear adhesive OCA 1873 layer 3850 was used to laminate the optical film to lightguide 3820. Measurements similar to those described in Example 18 were made and are summarized in Table I. FIG. 6E is a grayscale conoscopic image of the measured luminance of the backlight as a function of viewing angle.

EXAMPLE 6

Figure 7:
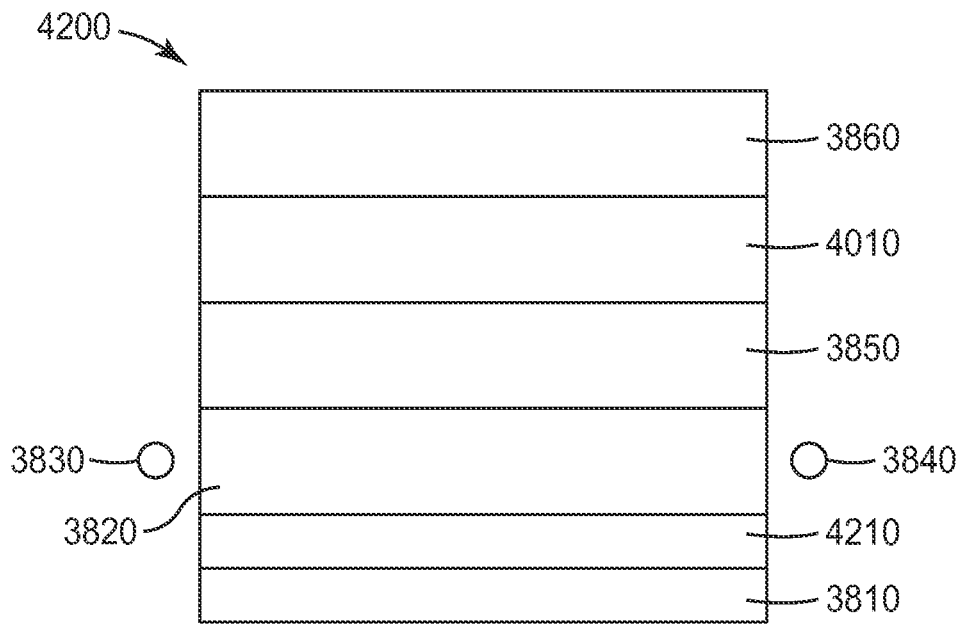
FIG. 7 is a schematic side-view of another backlight.

A backlight 4200, a schematic side-view of which is shown in FIG. 7, was made. The backlight was similar to the backlight 4000 except that the back reflector 3810 was laminated to the bottom of lightguide 3820 using optical adhesive layer 4210.

Reflective polarizer 3860 was the same as the reflective polarizer in Example 2. Back reflector 3810 was a multilayer polymeric mirror made with 550 alternating layers of PEN and PMMA. The back reflector had a reflection band extending from about 400 nm to about 1600 nm at normal incidence. The average reflectivity of the back reflector over that wavelength range was about 99%. Back reflector 3810 was laminated to lightguide 3820 using an optically clear adhesive OCA 1873 layer 4210.

Figure 6F:
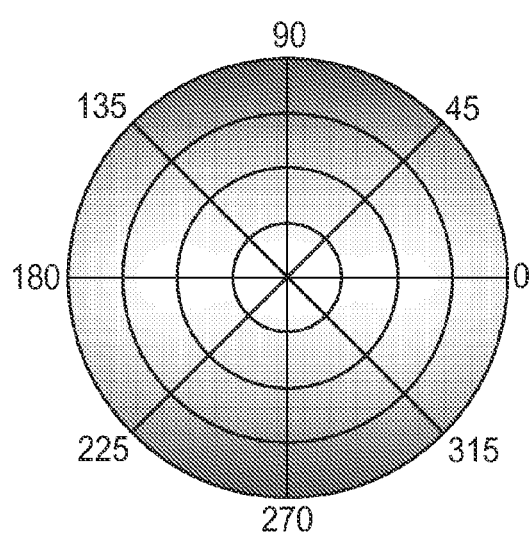

Optical film 4010 was made by coating solution D from Example D on reflective polarizer layer 3860 (the same as the reflective polarizer in Example 1) using the coating method described in Example F, except that the syringe flow rate was 2.3 cc/min and the UV LED current was 4 Amps (resulting in a UV-A dose of 0.0416 joules per square cm). The index of the resulting optical film was about 1.19. The optical haze of the optical film was 90%. The thickness of the optical film was about 5 microns. Next, optically clear adhesive OCA 1873 layer 3850 was used to laminate the optical film to lightguide 3820. Measurements similar to those described in Example 18 were made and are summarized in Table I. FIG. 6F is a grayscale conoscopic image of the measured luminance of the backlight as a function of viewing angle.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if optical construction 3600 in FIG. 1 is flipped as compared to the orientation in the figure, layer 3670 is still considered to be a "top" layer.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A lightguide comprising:
   a light guiding layer for propagating light by total internal reflection; and
   a first optical film disposed on the light guiding layer and comprising:
   a binder, a plurality of particles, and a plurality of interconnected voids;
   an optical haze that is not less than about 30%; and
   a porosity that is not less than about 20%; and
   a reflective polarizer layer disposed on the first optical film, wherein the reflective polarizer layer has a first average reflectance for visible light polarized in a first plane, and a second average reflectance for visible light polarized in a second plane orthogonal to the first plane, the first average reflectance being greater than the second average reflectance;
   wherein substantial portions of each two neighboring major surfaces in the lightguide are in physical contact with each other.

2. The lightguide of claim 1, wherein the first optical film has an optical haze that is not less than about 40%.

3. The lightguide of claim 1, wherein the first optical film has an optical haze that is not less than about 50%.

4. The lightguide of claim 1, wherein the first optical film has an optical haze that is not greater than about 80%.

5. The lightguide of claim 1, wherein the first optical film has an optical haze that is not greater than about 70%.

6. The lightguide of claim 1, wherein the first optical film has a porosity that is not less than about 40%.

7. The lightguide of claim 1, wherein the first optical film has a porosity that is not less than about 60%.

8. The lightguide of claim 1, wherein the first optical film has an effective index of refraction that is not greater than about 1.3.

9. The lightguide of claim 1, wherein the first optical film has an effective index of refraction that is not greater than about 1.2.

10. The lightguide of claim 1, wherein a weight ratio of the binder to the plurality of the particles is not less than about 1:2.

11. The lightguide of claim 1, wherein at least 50% of each two neighboring major surfaces in the lightguide are in physical contact with each other.

12. The lightguide of claim 1, wherein at least 70% of each two neighboring major surfaces in the lightguide are in physical contact with each other.

13. The lightguide of claim 1, wherein at least 90% of each two neighboring major surfaces in the lightguide are in physical contact with each other.

14. A backlight comprising:
    the lightguide of claim 1 having a light emitting surface; and
    a light source disposed along an edge of the lightguide, wherein uniformity of light emitted by the light emitting surface of the lightguide is not less than about 50% across the light emitting surface.

15. The backlight of claim 14 further comprising a back reflector proximate a major surface of the light guiding layer for reflecting light that exits the lightguide.

16. The backlight of claim 15, wherein the back reflector is a specular reflector.

17. The backlight of claim 15, wherein the back reflector is a diffuse reflector.

18. The backlight of claim 15, wherein the back reflector is a semi-specular reflector.

19. The backlight of claim 15, wherein the back reflector is partially reflective and partially transmissive.

20. The backlight of claim 15, wherein the back reflector is structured.

21. The backlight of claim 14, wherein the reflective polarizer layer comprises a structured surface.

22. The backlight of claim 14, wherein the first average reflectance is at least about 90%, and the second average reflectance is in a range from about 25% to about 90%.

23. A display system comprising:
    the backlight of claim 14; and
    a liquid crystal panel disposed on the backlight.

24. A display system displaying an image and comprising a plurality of discrete displays, an output light intensity of each discrete display being individually controllable, at least one discrete display in the plurality of discrete displays comprising the backlight of claim 14.

25. The display system of claim 24, wherein each discrete display displays a different portion of the displayed image.

26. The lightguide of claim 1 further comprising a second optical film disposed on the light guiding layer opposite the first optical film, the second optical film comprising a plurality of voids.

27. The backlight of claim 14, further comprising an adhesive layer between the optical film and the reflective polarizer layer.

* * * * *

UNITED STATES PATENT AND TRADEMARK OFFICE
CERTIFICATE OF CORRECTION

PATENT NO. : 8,891,038 B2  
APPLICATION NO. : 13/264354  
DATED : November 18, 2014  
INVENTOR(S) : William Coggio Page 1 of 1

It is certified that error appears in the above-identified patent and that said Letters Patent is hereby corrected as shown below:

Title Page

Column 1, item (56) Other Publications,
Line 33, delete "Nanopourous" and insert -- Nanoporous --, therefor.

Specification

Column 10,
Line 17, delete "Pentaerthritol" and insert -- Pentaerythritol --, therefor.
Line 56, delete "Siquest" and insert -- Silquest --, therefor.
Line 59, delete "mothoxy" and insert -- methoxy --, therefor.

Signed and Sealed this
Fifth Day of April, 2016

Michelle K. Lee
*Director of the United States Patent and Trademark Office*